United States Patent [19]

Mehrgardt et al.

[11] Patent Number: 4,757,390

[45] Date of Patent: Jul. 12, 1988

[54] VIDEO RECORDER WITH A MAGNETIC RECORDING MEDIUM IN THE FORM OF A TAPE

[75] Inventors: Soenke Mehrgardt, March; Heinrich Pfeifer, Denzlingen; Thomas Fischer, Umkirch; Peter M. Flamm, Freiburg, all of Fed. Rep. of Germany

[73] Assignee: Deutsche ITT Industries GmbH, Freiburg, Fed. Rep. of Germany

[21] Appl. No.: 760,396

[22] Filed: Jul. 30, 1985

[30] Foreign Application Priority Data

Aug. 3, 1984 [EP] European Pat. Off. ........ 84109223.2

[51] Int. Cl.⁴ .............................................. H04N 9/80
[52] U.S. Cl. ....................................... 358/310; 358/11
[58] Field of Search ................. 358/11, 310, 320, 324, 358/326

[56] References Cited

U.S. PATENT DOCUMENTS

| 4,445,143 | 4/1984 | Machida et al. | 358/310 |
| 4,549,224 | 10/1985 | Nakamura et al. | 358/310 |
| 4,583,113 | 4/1986 | Pritchard | 358/11 |
| 4,587,556 | 5/1986 | Collins | 358/11 |
| 4,593,315 | 6/1986 | Willis et al. | 358/11 |
| 4,633,293 | 12/1986 | Powers | 358/11 |
| 4,633,295 | 12/1986 | Van de Polder et al. | 358/11 |
| 4,652,906 | 3/1987 | Baugh | 358/11 |

*Primary Examiner*—Donald McElheny, Jr.
*Attorney, Agent, or Firm*—T. L. Peterson

[57] ABSTRACT

To raise the integration level of a video recorder, and to provide a uniform circuit concept suitable for all three color-television standard (PAL, NTSC, SECAM) which, in particular, requires only slight modifications for adaptation to the respective standard, signal processing is performed by fast digital circuits whose signals are stored on the recording medium not in digital form, but after digital-to-analog conversion. The composite color signal is converted into digital form by a fast analog-to-digital converter (aw) whose sampling signal (fc) has a fixed frequency (Fc) for all three color-television standards. Digital signal processing in the chroma channel is performed at a fixed subcarrier frequency (zt) for all three color-television standards which is an integral subharmonic of the sampling frequency (Fc).

16 Claims, 9 Drawing Sheets

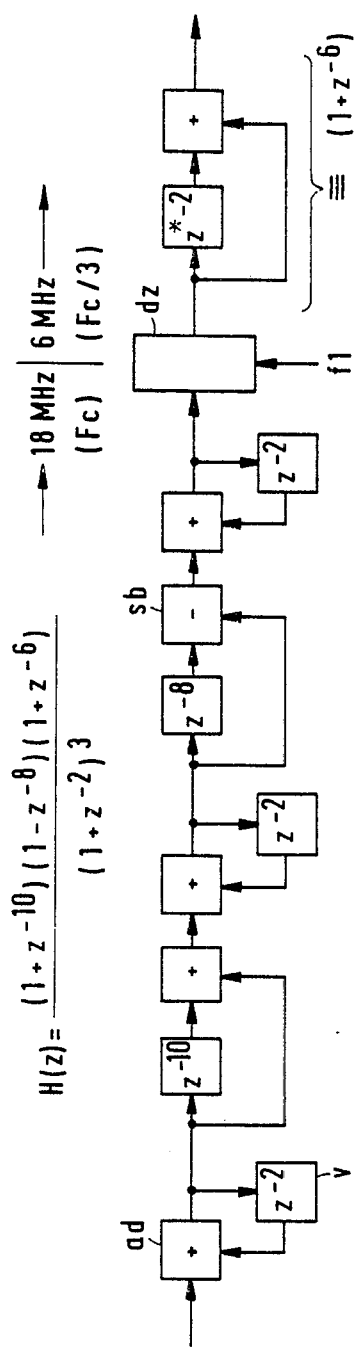
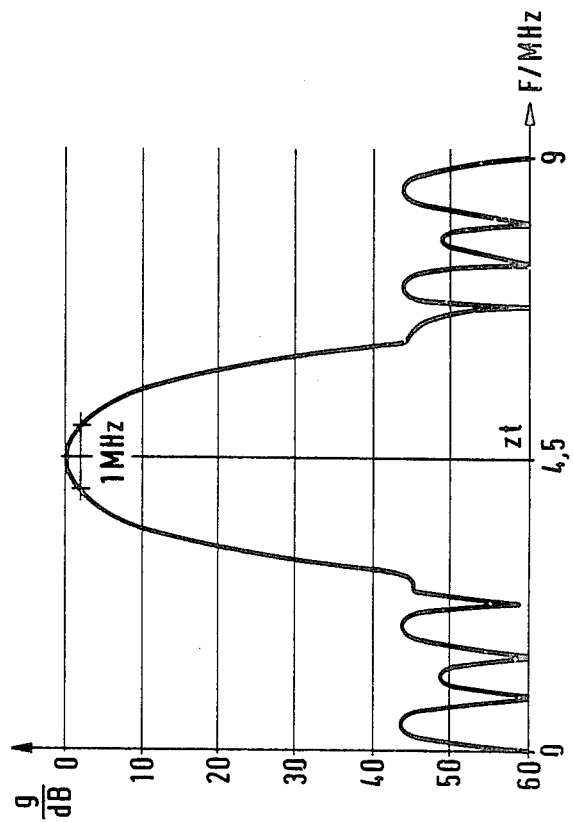
FIG.6

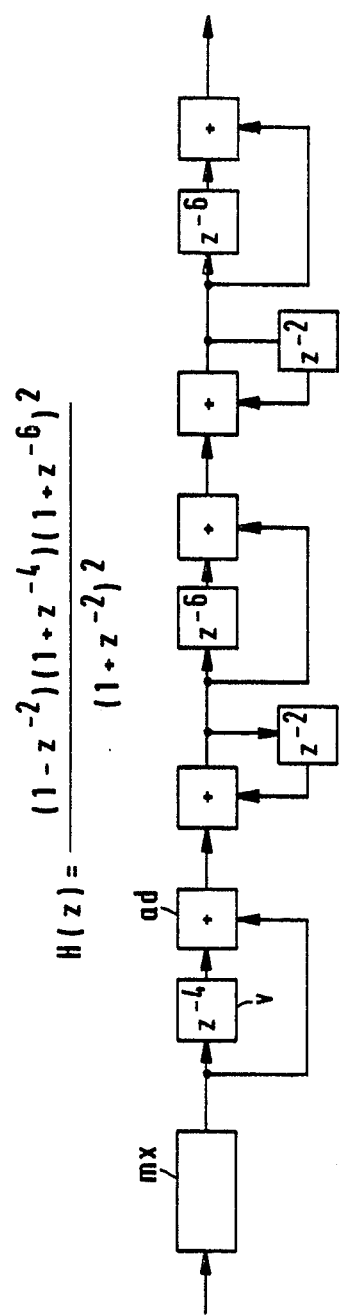
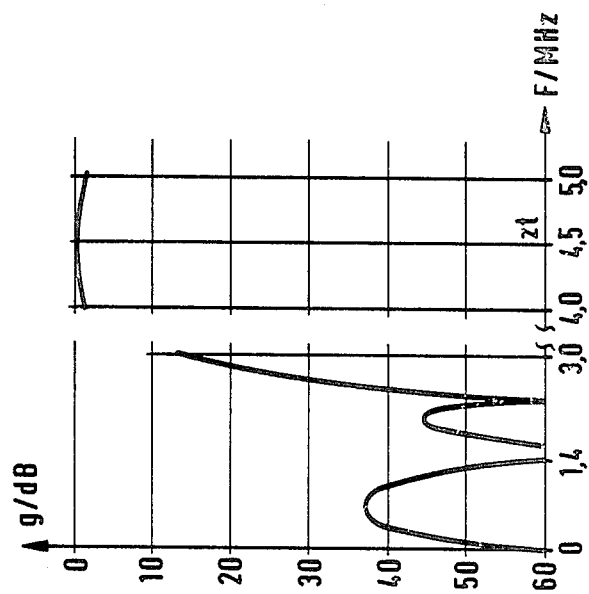
FIG. 8

VIDEO RECORDER WITH A MAGNETIC RECORDING MEDIUM IN THE FORM OF A TAPE

BACKGROUND OF THE INVENTION

The invention pertains to a video recorder. In particular, the invention pertains to a video recorder using magnetic tape as the recording medium.

In video recorders of the three systems commonly used at present, i.e., VHS, Video 2000, and Betamax, the chroma signal, after being separated from the demodulated composite color signal, is changed to a carrier signal having a frequency lower than the standard chrominance-subcarrier frequency. The composite video signal is subjected to a frequency modulation, and the sum of the chroma signal of reduced carrier frequency and the frequency-modulated composite video signal is stored on the recording medium by means of a head system. The stored signal is read from the tape by means of the head system during playback, and is then transformed back into the composite color signal.

For the VHS system, the "lower" chrominance-subcarrier frequency is 627 kHz in the case of the PAL standard and 629 kHz in the case of the NTSC standard, the two frequencies being 40.125 and 40 times the horizontal scanning frequencies of PAL and NTSC, respectively. During playback, the coupling of these carrier frequencies with the respective horizontal scanning frequency makes it possible to compensate for variations in tape speed so precisely that in-phase regeneration of the original chrominance subcarrier frequency can be achieved.

Hence it is obvious that, beyond the circuits commonly used in television sets, additional circuits are necessary in video recorders. In conventional video recorders, these additional circuits are implemented predominantly with discrete components and only to a small extent with monolithic integrated circuits performing selected analog-signal-processing functions.

SUMMARY OF THE INVENTION

The general object of the invention is to raise the integration level, i.e., to increase the extent of the use of monolithic integrated circuits, using a novel uniform circuit concept suitable for all three color-television standards, viz., PAL, NTSC, and SECAM, i.e., a circuit concept which requires only slight modifications for adaptation to the respective standard. In particular, these modifications are to have only a slight effect on the over-all circuit concept, thus giving an optimum circuit concept for all three color-television standards.

In accordance with the invention the signal processing required in the respective video-recorder system is performed by means of fast digital circuits, but, instead of storing the output signals of these digital circuits in digital form on the magnetic tape, these signals are converted back into corresponding analog signals prior to the storage. According to the invention, a first analog-to-digital converter is therefore provided whose sampling signal has a fixed frequency for all three color-television standards.

Further in accordance with the invention the digital signal processing is performed in the chroma channel at a fixed subcarrier frequency for all three color-television standards which is an integral subharmonic of the sampling frequency.

In accordance with the invention the signal processing both during the record mode and during the playback mode is performed by digital circuits, which permits a considerably higher integration level for video recorders.

BRIEF DESCRIPTION OF THE DRAWING

The invention will be better understood from a reading of the following detailed description in conjunction with the drawings in which:

FIG. 6 shows a block diagram and the frequency-response curve of a preferred first standard-band-pass filter;

FIG. 8 shows a block diagram and the frequency-response curve of a preferred first interpolator.

DETAILED DESCRIPTION

Figure 1:
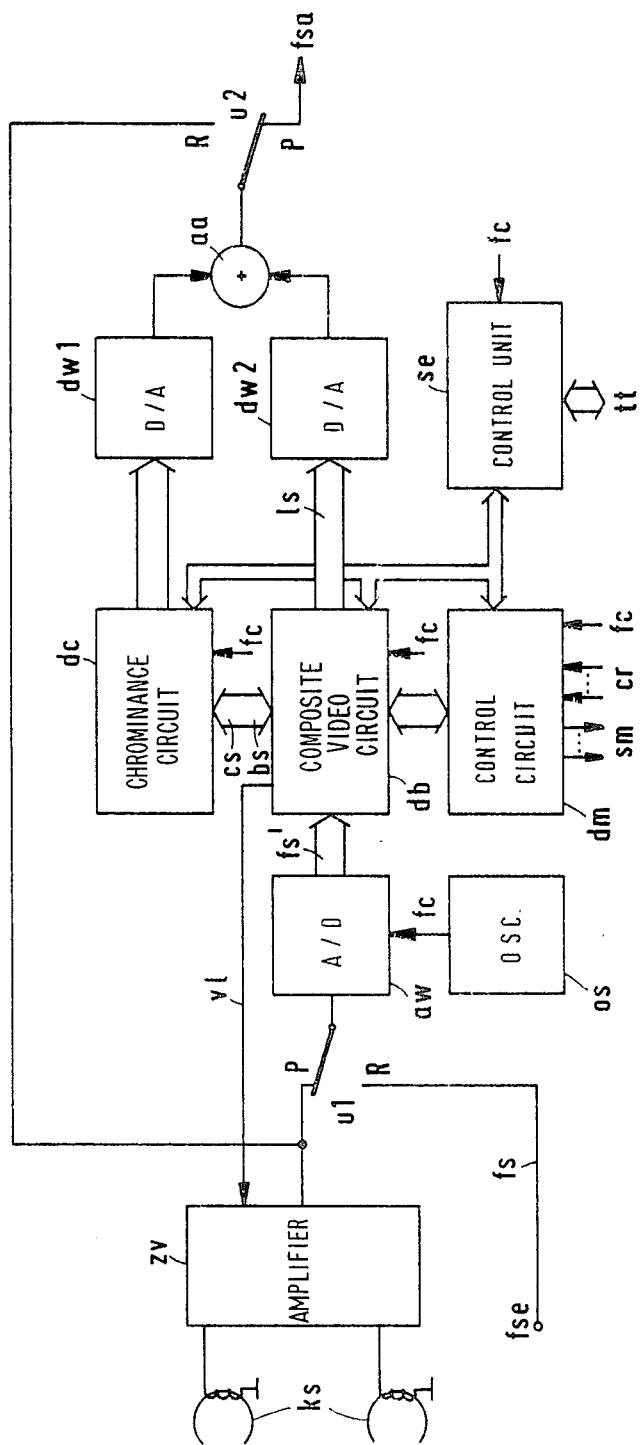
FIG. 1 is a block diagram of a general embodiment of the circuit in accordance with the invention.

FIG. 1 shows a general embodiment of the invention in a block diagram. The analog input of the fast analog-to-digital converter aw is connected via the first changeover switch ul either to the composite-color signal input fse during the record mode R or to the output of the bidirectional amplifier arrangement zv for the head system ks during the playback mode P. Of the head system ks, two heads are shown schematically. As the analog-to-digital converter aw is to be a fast one, it is preferably a so-called flash converter whose output provides a multibit, parallel digital word at the pulse-repetition frequency Fc of the sampling signal fc. The latter is generated by the sampling oscillator os, which oscillates at a fixed frequency for all three color-television standards, PAL, NTSC, and SECAM. In a preferred embodiment, this frequency is in the range from about 18 to 20 MHz, e.g., 18 MHz.

During the record mode R, the digital words appearing at the output of the analog-to-digital converter aw thus represent the digitized composite color signal fs'. This signal is processed in three fast digital circuits db, dc, dm which communicate with each other and handle the signals at least partly in parallel. The digital circuit db processes essentially the composite video signal and separates the synchronizing signals from the video signal, so that its output provides pure digital luminance signals ls. It also separates the chroma signal cs from the composite color signal fs'. The chroma signal cs is processed in the digital circuit dc in accordance with the standard. The digital circuit dm produces control signals sm for the motors of the head and tape drives and is fed with correction signals cr. The three fast digital circuits db, dc, dm, too, are clocked by the sampling signal fc of fixed frequency.

FIG. 1 also shows that the control unit se, which is clocked by the sampling signal fc, is connected to the controls tt of the video recorder and transfers the signals or commands coming from there to the fast digital circuits db, dc, dm.

The outputs of the two digital circuits dc and db are connected to the first and second digital-to-analog converters dw1 and dw2, respectively, whose output signals are added by the analog adder aa to form the above-mentioned analog signal to be stored on the magnetic recording medium. In the record mode R, the output of the analog adder aa is thus connected via the second changeover switch u2 to the amplifier zv, whose gain characteristics are controllable from the digital circuit db over the line v1 depending on whether the recorder is in the record or playback mode. In the playback mode P, the input of the analog-to-digital converter aw is connected to the amplifier zv via the first changeover switch u1, and the output of the analog adder aa to the composite-color-signal output fsa via the second changeover switch u2.

In the representation of FIG. 1, a distinction is made between lines for transferring analog signals and lines for transferring digital signals. While the former are drawn as the usual solid lines, the latter are shown in the form of stripes representing buses which consist of at least as many parallel conductors as there are bits in the digital words to be processed.

Figure 2:
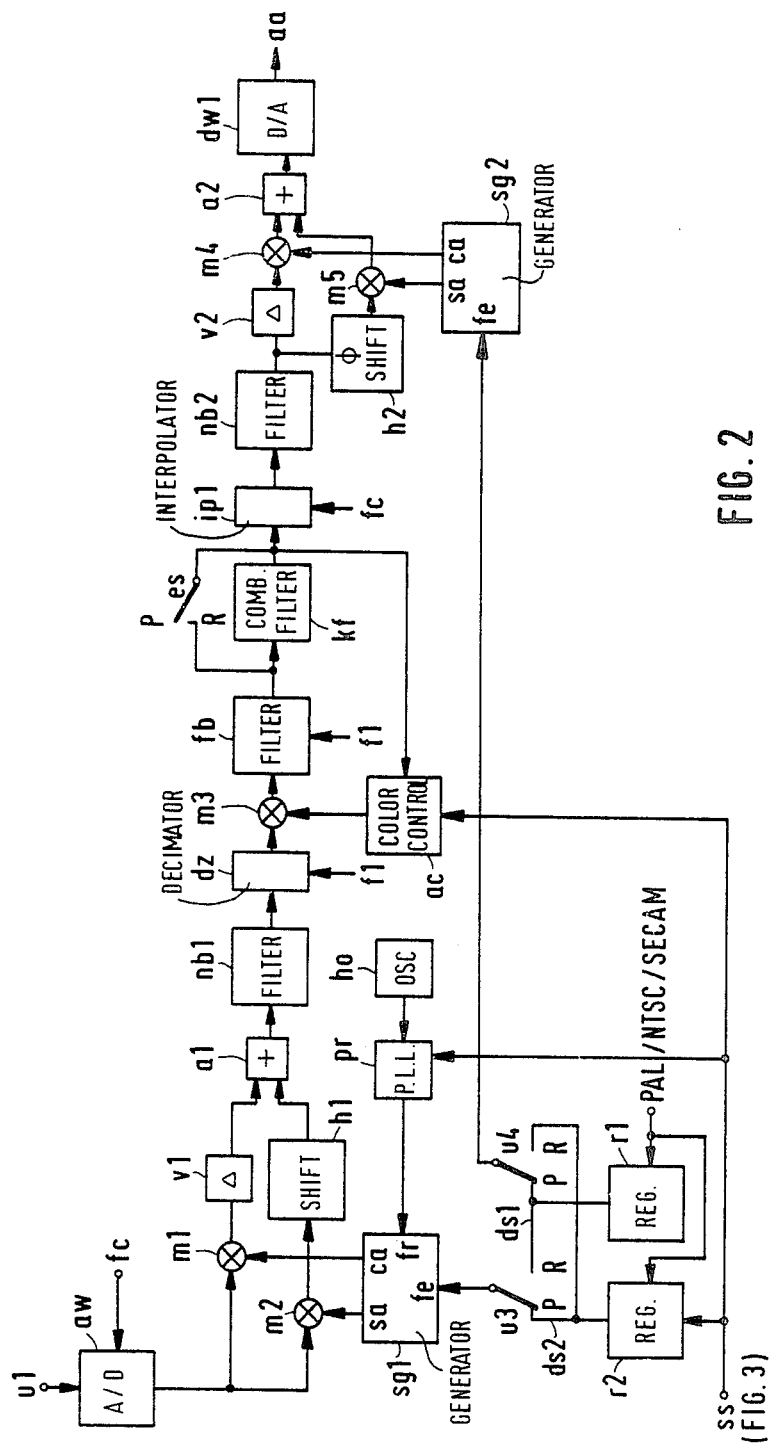
FIG. 2 is a block diagram of an embodiment of a chroma circuit in accordance with the invention.

FIG. 2 shows an embodiment of the chrominance-signal-processing circuit in a block diagram. for the sake of completeness and clarity, the signal path in the circuit diagram begins with the analog-to-digital converter aw, to which a signal is applied from the changeover switch u1. The circuit of FIG. 2 is used both in the record mode and in the playback mode; only individual operating parameters are switched over, not the direction of signal flow.

The output of the analog-to-digital converter aw is coupled to the first inputs of the first and second digital multipliers m1 and m2, whose second inputs are connected to the cosine output ca and the sine outputs sa, respectively, of the first frequency-settable and -controllable digital sine-wave generator sg1. The output of the first multiplier m1 is coupled through the first digital delay element v1, which provides a delay equal to that of the first digital 90° phase shifter h1, to the first input of the first digital adder a1, and the output of the second multiplier m1 is coupled through the first 90° phase shifter h1 to the second input of the first digital adder a1. For the VHS system, the frequency-setting input fe of the first sine-wave generator sg1 is presented in the record mode R with the first digital signal ds1, which is equal to the difference between one-quarter of the sampling frequency Fc and the respective chrominance-subcarrier frequency, and during playback P with the second digital signal ds2, which is equal to the sum of one-quarter of the sampling frequency Fc and 40 times the horizontal frequency in the case of the NTSC standard or 40.125 times the horizontal frequency in the case of the PAL and SECAM standards. Thus, depending on the television signal transmitted by one of the three color-television standards, the associated chrominance-subcarrier frequency or the horizontal frequency is entered into the first sine-wave generator sg1. This is indicated in FIG. 2 by the two registers r1, r2, which contain or calculate the digital signals ds1, ds2 and deliver them according to the standard selected, as is indicated at the input marked with the three standard designations PAL, NTSC, SECAM. The second register r2 is also presented with the horizontal synchronizing pulse ss. The different application of the digital signals ds1, ds2 to the sine-wave generators sg1, sg2 during record and playback is accomplished with the third and fourth electronic changeover switches u3, u4.

In the Video-2000 and Betamax systems, the digital signals ds1, ds2 must be chosen according to the frequency of the respective "lower" chrominance subcarrier.

The subcircuit consisting of the two multipliers m1, m2, the delay element v1, the 90° phase shifter h1, the adder a1, and the digital sine-wave generator sg1 represents a digital quadrature mixer which shifts the chrominance-subcarrier frequency of the composite color signal in the case of all three color-television standards to exactly one-fourth of the sampling frequency Fc. In the embodiment of FIG. 2, this sampling frequency Fc is the subcarrier frequency zt.

The output of the adder a1 is coupled to the input of the standard-band-pass filter nb1, whose passband is set according to the respective color-television standard. Like the two registers r1, r2, the standard-band-pass filter nb1 thus has a setting input, which is not shown in FIG. 2 for simplicity. The output of the standard-band-pass filter nb1 is connected to the first input of the third multiplier m3 through the digital decimator dz, whose sampling frequency f1 is equal to one-third of the sampling frequency Fc. The output of the third multiplier m3 is coupled to the input of the digital signal-forming band-pass filter fb, whose output is connected via the digital comb filter kf to the input of the first digital interpolator ip1, which is clocked by the clock signal fc. The switch es is closed in the record mode R, so that the digital comb filter kf is active only during the playback mode P.

The function of the decimator dz and the first interpolator ip1 is to enable the chroma-signal-processing subcircuits to operate not at the high sampling frequency Fc, but at a more favorable, lower clock frequency F1. As a result, sufficient time is available for these processing operations, and the amount of circuitry required for the comb filter kf is reduced considerably.

The output of the interpolator ip1 is coupled through the second digital standard-band-pass filter nb2 and the second digital delay element v2, whose delay is equal to that introduced by the second 90° phase shifter h2, to the first input of the fourth digital multiplier m4, and through the second standard-band-pass filter nb2 to the input of the second 90° phase shifter h2, which has its output connected to the first input of the fifth digital multiplier m5. The second inputs of the fourth and fifth multipliers m4 and m5 are connected to the cosine output ca and the sine output sa, respectively, of the second frequency-settable digital sine-wave generator sg2, while the outputs of these multipliers are fed through the second adder a2 to the input of the first digital-to-analog converter dw1.

The frequency-setting input fe of the second sine-wave generator sg2 is fed with the second digital word ds2 in the record mode R and with the first digital word ds1 in the playback mode P. The delay element v2, the 90° phase shifter h2, the two multipliers m4, m5, the adder a2, and the sine-wave generator sg2, like the corresponding sub-circuits v1, h1, m1, m2, a1, and sg1 behind the analog-to-digital converter aw, form a quadrature mixer. The two quadrature mixers differ in that the arrangement of the subcircuits of the first-explained mixer is a mirror image of the arrangement of the subcircuits of the second mixer, so to speak, which is an essential feature of the invention. This simplifies the overall circuit for the chroma channel considerably, because otherwise, switchable and, thus, complicated filters would be necessary. Thus, while in the second quadrature mixer with the subcircuits v2, h2, m4, m5, a2, and sg2, which is of conventional design, the two signals to be mixed, which are separated in phase by exactly 90°, are produced, then mixed with the cosine wave and the sine wave, respectively, from the sine-wave oscillator sg2, and finally added, the first quadrature mixer first mixes the input signal with the sine wave and the cosine wave, respectively, from the sine-wave oscillator and only then produces the quadrature signal from the cosine-multiplied signal.

Besides the frequency-setting input fe, the first sine-wave generator sg1 has the phase-control input fr, which is connected to the output of the digital phase-locked loop pr. The latter compares the digital horizontal synchronizing signal ss with the signal from the digital horizontal deflection oscillator ho. The sine-wave generator sg1 is thus comparable to an analog PLL oscillator, and its frequency stability corresponds to that of a conventional crystal oscillator.

The second input of the third multiplier m3 is connected to the output of the digital automatic color-control stage ac, whose signal input is connected to the output of the comb filter kf, and whose clock input is presented with the horizontal synchronizing pulses ss.

The color-control stage ac maintains the amplitude of the color-burst signal at a constant value to achieve optimum level control during recording and compensate for amplitude variations caused, for example, by varying tape properties during playback. It also increases and reduces the amplitude of the color-burst signal in accordance with the standard.

Recorders usually have two heads which are alternately in contact with the recording medium. In the color-control stage ac, the controlled variables for the two heads are then determined separately to compensate for systematic differences between the two channels. To this end, the color-control stage is presented with an additional signal (not shown) which designates the head being in tape contact.

The signal-forming band-pass filter fb, which operates at the reduced sampling frequency f1, establishes the exact, standard-pass-band characteristic in the chroma branch; the band-pass filter nb1 performs only a coarse preselection and is, therefore, easy to implement.

The comb filter kf increases the crosstalk attenuation between adjacent tracks of the recording medium during playback, using the usual line-by-line phase changes of the chroma signal during recording. Depending on the standard, the phase of the chroma signal is changed line by line in such a way that during playback, the crosstalk components just cancel each other in a suitable comb filter. In FIG. 2, these phase changes are caused during recording by suitable signals at the frequency-setting input fe of the sine-wave generator sg2, and cancelled during playback by corresponding signals at the frequency-setting input of the sine-wave generator sg1.

Figure 3:
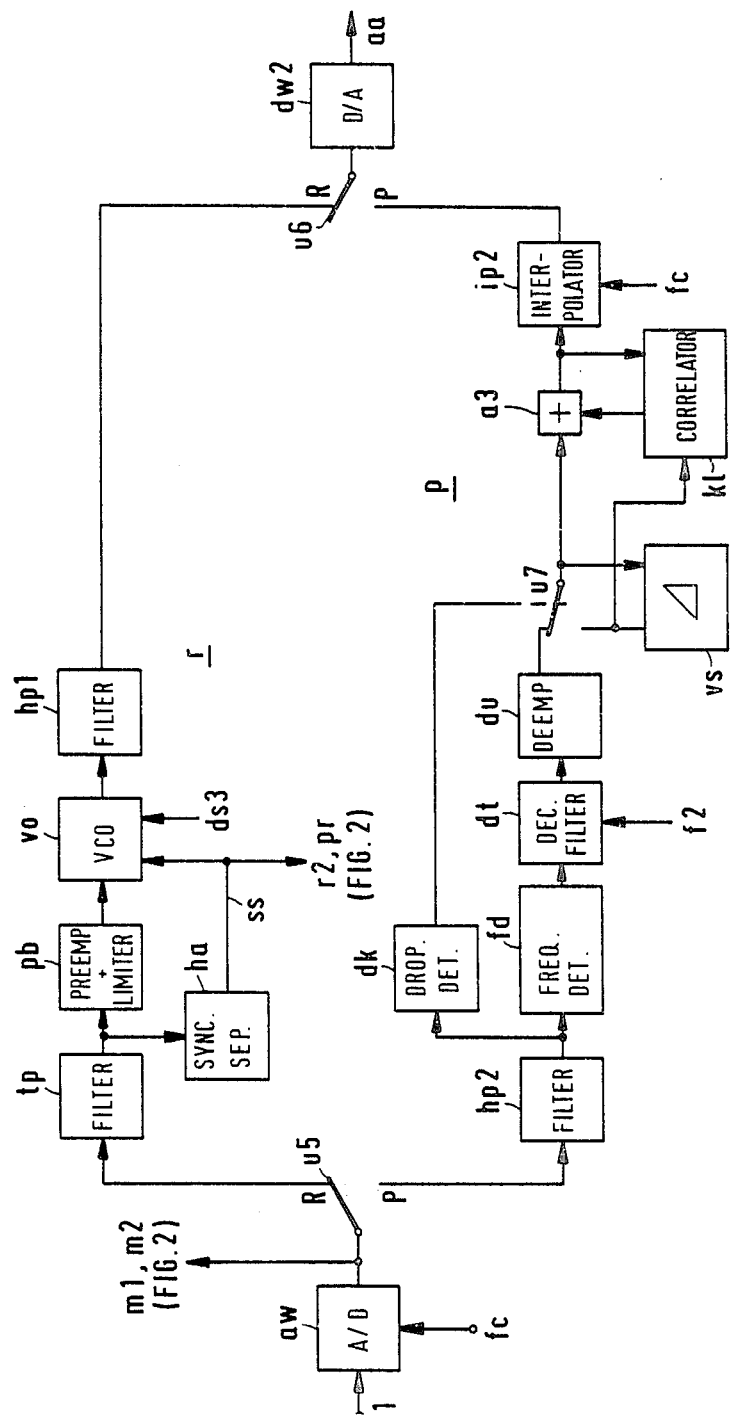
FIG. 3 is a block diagram of an embodiment of a video-signal-processing circuit in accordance with the invention.

FIG. 3 shows a block diagram of an embodiment of the video-signal-processing circuit. Here, unlike in the chroma-signal-processing circuit, it is impossible to manage with a single channel for recording and playback. The first subchannel r serves for recording, R, and the second subchannel p for playback, P. The sampling signal is again the signal fc, whose fixed frequency Fc preferably lies in the range from about 18 to 20 MHz, i.e., the analog-to-digital converter aw is again located at the beginning of the signal path. In addition to controlling the multipliers m1, m2 of FIG. 2, its output signal is fed to the fifth electronic changeover switch u5, which, depending on the mode selected, R or P, routes the signal either to the subchannel r or to the subchannel p.

In the subchannel r, the output signal of the analog-to-digital converter aw is applied to the input of the low-pass filter tp, whose upper cutoff frequency is about 3 MHz, and whose output feeds the digital sync separator stage ha and is connected via the digital pre-emphasis and limiter stage pb to the input of the digital voltage-controlled oscillator vo, which serves as a frequency modulator. The digital voltage-controlled oscillator vo is fed with the third digital word ds3, which determines the oscillator's carrier frequency depending on the television standard. The output of the oscillator vo is connected to the input of the second digital-to-analog converter dw2 through the first digital high-pass filter hp1, whose lower cutoff frequency is about 1.5 MHz, and the sixth electronic changeover switch u6.

In the second subchannel p, the output signal of the analog-to-digital converter aw is applied through the changeover switch u5 to the second digital high-pass filter hp2, whose lower cutoff frequency is about 1.5 MHz, and whose output is coupled to the input of the second digital-to-analog converter dw2. In the special embodiment shown in FIG. 3, this coupling is accomplished as follows. The output of the frequency detector fd is connected to the input of the digital decimating low-pass filter dt, whose upper cutoff frequency is about 3 MHz, and to which the clock signal f2 with half the sampling frequency, Fc/2, is applied, so that the digital words appear at the output of this filter at this clock rate F2. The decimating low-pass filter dt is followed by the digital deemphasis and noise-reduction stage du, whose output is connected to the first input of the third adder a3 via the first input-output path of the seventh electronic changeover switch u7, and to the first input of the digital correlator k1 via the second input-output path of the changeover switch u7. The second input of the digital correlator k1 is connected to the output of the third adder a3, and its output is coupled to the output of the second input of this adder a3. The output of the changeover switch u7 is also connected to the input of the delay stage vs, which provides a delay equal to one line period of the television system. Connected to the output of the third adder a3 is the second digital interpolator ip2, which is clocked by the sampling signal fc and has its output connected via the sixth electronic changeover switch u6 to the input of the second digital-to-analog converter dw2. The control input of the changeover switch u7 is connected to the output of the dropout detector dk, whose input is energized by the output of the second high-pass filter hp2.

The dropout detector dk is a comparator circuit which, when the input level falls below a predetermined value, operates the changeover switch u7, so that the weak and, consequently, very noisy signal from the recording medium is replaced by the signal of the preceding scanning line from the delay stage vs.

Noise reduction is also accomplished by the correlator k1. In this conventional circuit, noise is suppressed by filtering in case of slight deviations of the signals of successive scanning lines, while in case of larger deviations, the filter is switched off ("motion detector") to avoid disturbances caused by fast vertical image changes.

Figure 4:
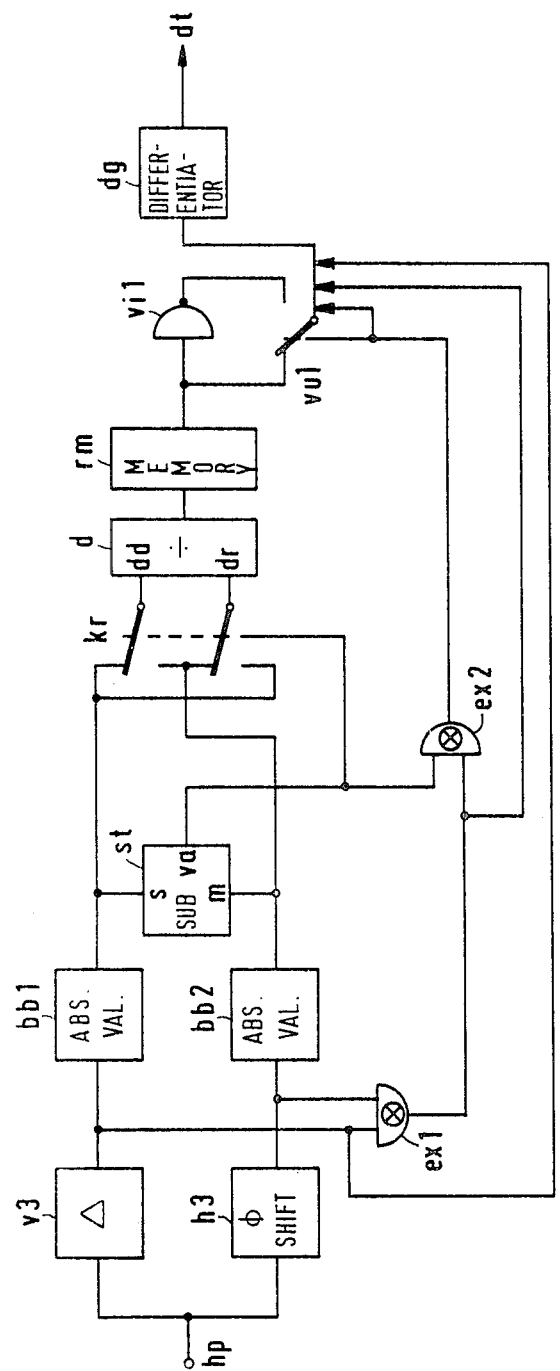
FIG. 4 is a block diagram of a preferred embodiment of the digital frequency detector needed in the circuit of FIG. 3.

FIG. 4 shows a block diagram of a preferred embodiment of the frequency detector fd of FIG. 3. The input of the detector is connected to the subtrahend input s of the subtracter st and to the first signal input of the electronic multiple intermediate switch kr through the third delay element v3, producing a delay equal to that of the third digital 90° phase shifter h3, and the first digital absolute-value stage bb1. The third 90° phase shifter h3 is located between the input of the frequency detector and the input of the second digital absolute-value stage bb2, which has its output connected to the minuend input m of the subtracter st and to the second signal input of the mulitple intermediate switch kr. The control input of the latter is connected to the sign-signal output va of the subtracter st, and its two signal outputs are coupled, respectively, to the dividend input dd and the divisor input dr of the digital divider d, whose output is connected to the address input of the read-only memory rm, which holds the arc-tangent values of the first half-quadrant.

The most significant bit of the output signal of the third delay element v3 and that of the output signal of the third 90° phase shifter h3 are fed to the first and second inputs, respectively, of the first exclusive-OR element ex1, whose output is applied to the first input of the second exclusive-OR element ex2, and whose second input is connected to the sign output of the subtracter st.

Each output of the read-only memory rm is followed by one of the inverters of the first multiple inverter vi1, whose inputs are connected to the first inputs of the individual switches of the first multiple switch vu1. The second inputs of these switches are connected to the outputs of the inverters of the multiple inverter vi1, and the common control input of the switches is connected to the output of the second exclusive-OR gate ex2, while the output of the first multiple switch vu1 is followed by the digital differentiator dg.

The bits of the output signal of the multiple switch vu1 are supplemented on the high-order side by the output of the second exclusive-OR element ex2 as the next higher-order bit, the output of the first exclusive-OR element ex1 as the next to the highest-order bit, and the sign bit of the output signal of the third delay element v3 as the highest-order bit. The output of the multiple switch vu1 is followed by the digital differentiator dg.

The intermediate switch kr is controlled from the sign output va of the subtracter st in such a way that a signal smaller than, or at most equal to, that at the divisor input dr is constantly applied to the dividend input dd of the divider d, so that the latter can have a fixed number of output bits, which would be impossible in the reverse cases, i.e., if division of a larger number by a smaller one were permitted, because the result in a limiting case could then approach infinity. By means of the two absolute-value stages bb1, bb2, the output signals of the delay element v3 and the 90° phase shifter h3 are freed from their signs. As a result of this and the measure just described for the divider d, the read-only memory rm needs to contain only those arc-tangent values which lie in the first half-quadrant, i.e., between 0° and 45°. The size of this read-only memory is thus reduced to a minimum.

By means of the two exclusive-OR elements ex1, ex2, the number of bits required to make up an angle of 360° is added to the output signals of the read-only memory rm again. The output of the multiple switch vu1 thus provides the phase-detected signal of the input signal to be frequency-detected, and from this phase-detected signal, the frequency-detected signal is derived by means of the differentiator dg.

Instead of generating the two signals in phase quadrature by means of the subcircuits v3, h3, these signals can be derived by means of an odd-order transversal filter. The odd order is important because such filters have an especially small amplitude error in their frequency-response characteristics in a frequency band symmetrical with respect to a quarter of the clock frequency of the transversal filter if the order of the filter is given.

For eight bits at the inputs of the subcircuits v3 and h3, seven bits behind the intermediate switch kr, and ten output bits, the chip area required by an MOS integrated circuit for a frequency detector as shown in FIG. 4 is estimated at about 6 mm$^2$.

Figure 5:
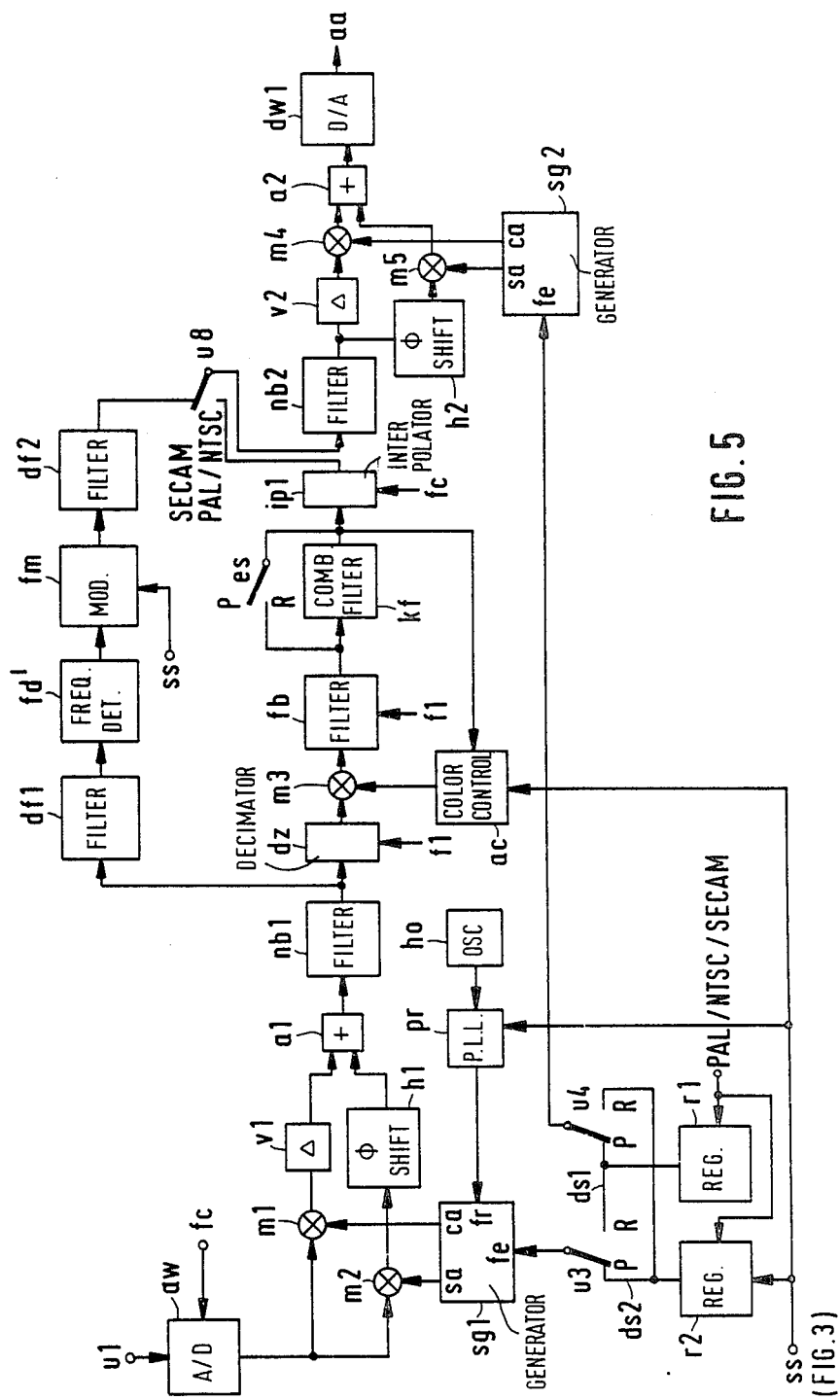
FIG. 5 is a block diagram of the additional subcircuits required in the circuit of FIG. 3 to process of SECAM signal.

FIG. 5 shows an embodiment of the arrangement of FIG. 2 which contains additional subcircuits for SECAM operation. Connected to the output of the first standard-band-pass filter nb1 is the first digital filter df1, whose characteristic is switchable from bell-shaped in record to inverse bell-shaped in playback; this feature is not shown in FIG. 5 for simplicity. Connected to the output of the first digital filter df1 is the additional digital frequency detector fd', which is followed by the digital frequency modulator fm, whose frequency deviation is switchable from a first value in record to a second value in playback, and which is activated by means of the horizontal synchronizing pulse ss only during the times that a chroma signal is present. The frequency modulator fm is followed by the second digital filter df2, whose characteristic is switchable from bell-shaped in playback to inverse bell-shaped in record (switchover feature not shown), and whose output is connected in the SECAM mode to the input of the second standard-band-pass filter nb2 via the first input-output path of the eighth electronic changeover switch u8. In the PAL/NTSC mode, the second input-output path of the changeover switch u8 connects the output of the first interpolator ip1 to the input of the second standard-band-pass filter nb2.

In the SECAM mode, instead of the subcircuits d1, n3', fb, kf, ip1, the subcircuits just mentioned, i.e., df1, fd', fm, df2, are thus in operation. The other subcircuits in the circuit diagram of FIG. 5 are the same as those in FIG. 2.

FIG. 6 shows a block diagram and the frequency-response characteristic of the preferred design of the first standard-band-pass filter nb1. Compared with the digital filters that could be used for this band-pass filter, the digital filter of FIG. 6 has quite an advantageous structure in regard to the number of adders ad and subtracters sb used. Its transfer function is $$H(z) = \frac{(1 + z^{-10})(1 - z^{-8})(1 + z^{-6})}{(1 + z^{-2})^3}.$$

As can be seen, the digital filter of FIG. 6 is composed of the adders ad, the subtracter sb, and delay elements v, each of which provides a delay equal to a multiple of the period of the filter's sampling signal, this multiple being equal to the positive value of the respective exponent of the base z.

As can also be seen in the block diagram of FIG. 6, the subcircuit for implementing the term $(1+z^{-6})$ is located behind the decimator dz, whose sampling signal f1 has a frequency F1 equal to one-third of the frequency Fc of the sampling signal fc. At a frequency Fc of 18 MHz, this subcircuit is thus operated at a frequency Fc/3 of 6 MHz. Accordingly, the delay element of the subcircuit behind the decimator dz, with the symbol $z^x$ and the exponent $-2$, gives a delay of 2Fc/3, which is equal to 6Fc.

The frequency-response curve shown in FIG. 6 gives the normalized attenuation g in dB as a function of the frequency F in MHz. The maximum of the curve is located at 4.5 MHz, which is equal to the above-mentioned subcarrier frequency zt.

Figure 7:
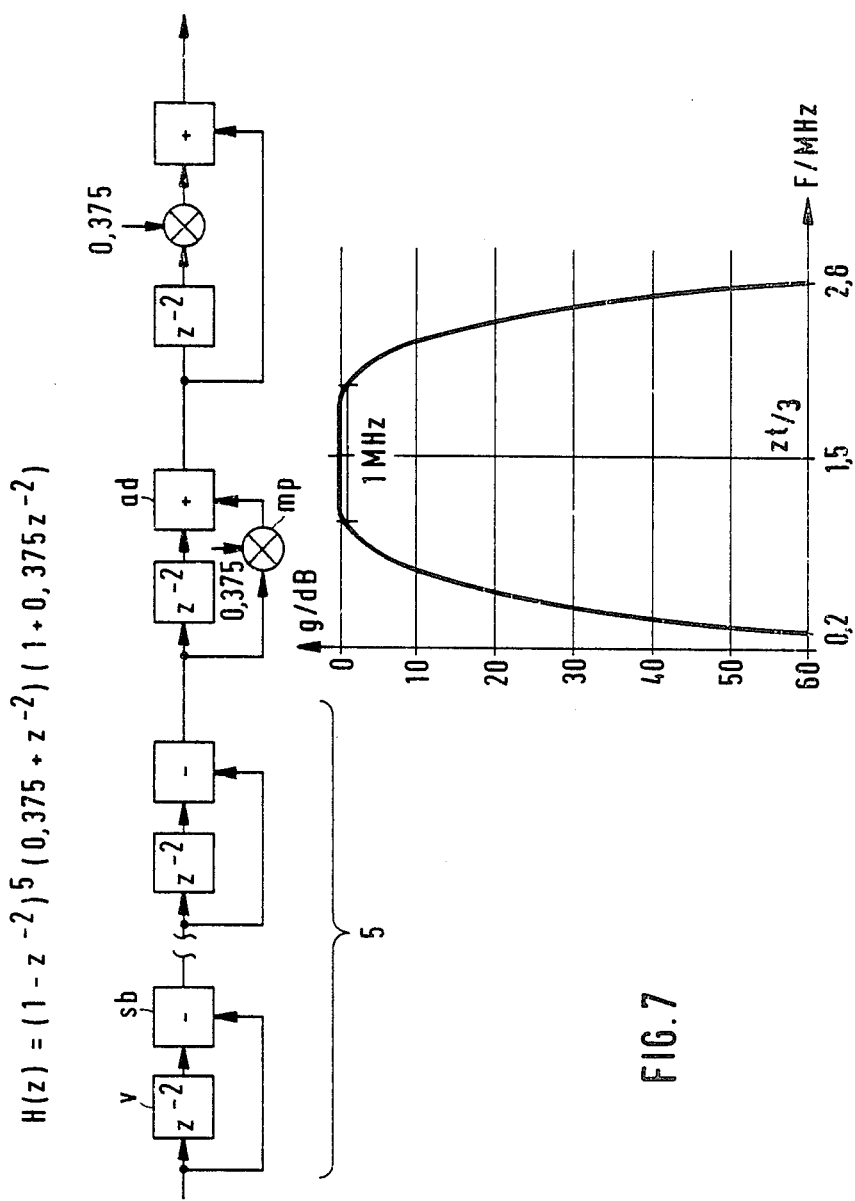
FIG. 7 shows a block diagram and the frequency-response curve of a preferred signal-forming band-pass filter.

FIG. 7 shows a block diagram and the frequency-response curve of the preferred design of the signal-forming band-pass filter fb of FIG. 2 or 5. In addition to the above-mentioned basic units ad, sb, and v, this digital filter contains multipliers mp, which cause the constant decimal factor 0.375 of the transfer function H(z) to become effective. The transfer function is $$H(z)=(1-z^{-2})^5(0.375+z^{-2})(1+0.375z^{-2}).$$

This digital filter, too, has an advantageous structure in terms of the number of adders and subtracters required. Its characteristic is symmetrical with respect to 1.5 MHz, which follows from the fact that this filter is clocked with the sampling signal f1 at the frequency Fc/3, so that the 4.5-MHz subcarrier frequency is shifted to one-third, too.

FIG. 8 shows a block diagram and the frequency-response curve of the preferred design of the first interpolator ip1, whose transfer function is $$H(z) = \frac{(1-z^{-2})(1+z^{-4})(1+z^{-6})^2}{(1+z^{-2})^2}.$$

The digital multiplexer mx at the input of the digital filter of FIG. 8 converts each digital input word e into the three-element sequence e, 0, -e. This three-element sequence corresponds to the realization of the term $(1-z^{-2})$.

The graphical representation of the frequency-response curve of the digital filter of FIG. 8 is interrupted i.e., compressed, between 3.0 MHz and 4.0 MHz. This digital filter is clocked with the sampling signal fc, so that the attenuation minimum (0 dB) is at 4.5 MHz if a sampling frequency Fc of 18 MHz is used.

Figure 9:
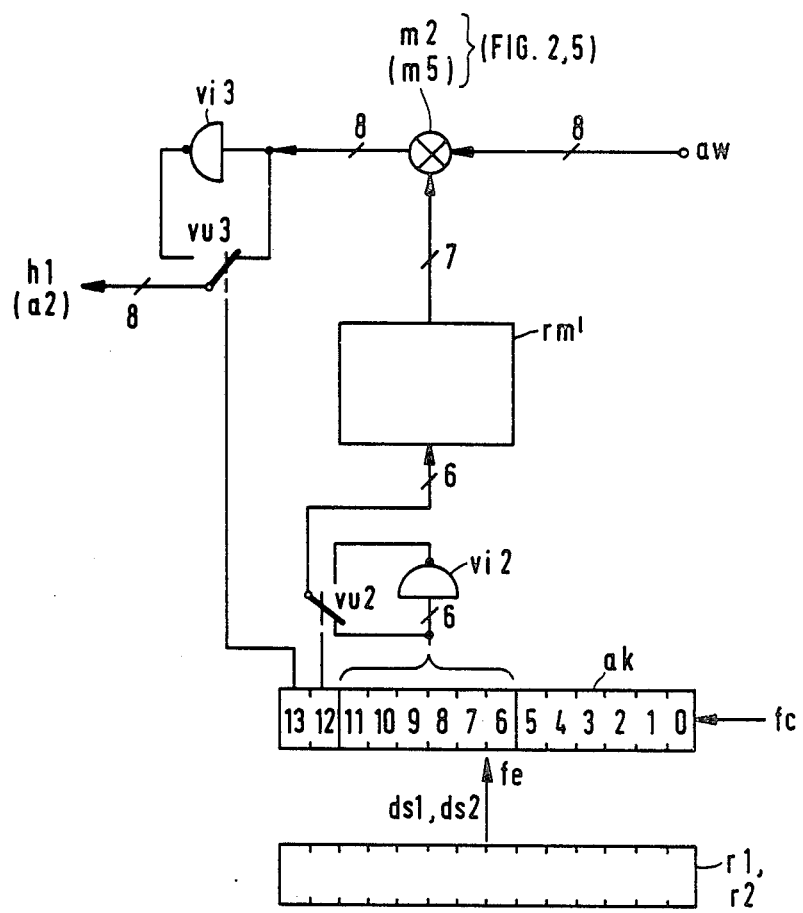
FIG. 9 is a block diagram of a preferred sine-wave generator.

FIG. 9 shows a block diagram of a preferred embodiment of the two sine-wave generators sg1 and sg2 with the associated multipliers m2 and m5, respectively, of FIGS. 2 and 5. Such a generator contains the j-bit digital accumulator ak; in the embodiment of FIG. 9, j=14. Accumulators, as is well known, are clocked summing circuits which, on receipt of each clock pulse, add the same number to the result obtained with the preceding clock pulse. The frequency-setting input fe is thus presented with one of the two digital words ds1, ds2 from one of the two registers r1, r2 of FIG. 2 or 5. The clock signal applied to the accumulator ak is the sampling signal fc.

Of the bits less significant than the (j-2)th bit, q bits of the output signal of the accumulator ak, where q is smaller than or equal to j-2, are fed through the individual inverters of the second multiple inverter vi2. In the embodiment of FIG. 9, q=6, so that the bits with the weights $2^6$ to $2^{11}$ are covered (assuming that the straight binary code is used).

The inputs of the individual inverters are connected to the first inputs of the individual switches of the second multiple switch vu2, while the second inputs of these switches are connected to the outputs of the individual inverters, and the common control input of the switches is connected to the output for the (j-1)th bit. The output of the second multiple switch vu2 is coupled to the address input of the additional read-only memory rm', which holds the sine values of the first quadrant and has its output connected to the first input of the multiplier m2 or m5. The second input of the multiplier is the signal input, and its output is connected to the inverters of the third multiple inverter vi3. The inputs of these inverters are connected to the first inputs of the individual switches of the third multiple switch vu3, while the second inputs of these switches are connected to the output of the inverters. The common control input of the switches of the third multiple switch vu3 is connected to the output for the jth bit of the accumulator ak, and the output of the third multiple switch vu3 delivers the input signal multipled by the sine-wave signal.

The two multiple inverters vi2, vi3 and the two multiple switches vu2, vu3 also serve to derive the sine values of the second to the fourth quadrants from the sine values of the first quadrant which are contained in the read-only memory rm'. In a similar and analogous manner, (not shown in FIG. 9), the cosine values at the cosine outputs ca of the sine-wave generators sg1, sg2 can be derived. For this purpose, one additional read-only memory, two additional multiple inverters, and two additional multiple switches may be provided, for example. However, it is also possible to take advantage of the relation between a sine function and a cosine function, namely that one follows from the other by a 90° phase shift, so that only the additional read-only memory rm' of FIG. 9, holding the sine values of the first quadrant, is required.

In FIGS. 2 to 9, all connections between the individual circuits are drawn as single-wire lines. This was done for clarity. Since, according to the principle underlying the invention, the subcircuits contained in FIGS. 2 to 9 are subcircuits processing digital signals in parallel, the interconnecting leads between the individual subcircuits must be thought of as buses, with a few exceptions, such as the control lines for the various changeover and multiple switches. In FIG. 9, the numbers of conductors of the buses are indicated by the numbers at the oblique strokes.

The invention can be implemented with monolithic integrated circuits, as was mentioned at the beginning. The overall circuit can be constructed as a single monolithic integrated circuit or divided among several integrated circuits, as required. Since all subcircuits are digital circuits, implementation with insulated-gate field-effect transistors, i.e., with so-called MOS technology, is particularly advantageous, but fast bipolar digital-circuit techniques may also be suitable for circuit implementation.

The principle used in the chroma channel—shifting the digital processing to a subharmonic of the clock frequency by the quadrature mixing regardless of the standard-dependent chrominance-subcarrier frequency and, thus, being able to use a fixed sampling frequency for all color-television standards—has the big advantage that only a single clock generator with a fixed frequency is required for the sampling signal. As this clock generator is usually a crystal oscillator, only a single crystal is necessary, while, if the clock frequency were "tied" to the standard-dependent fourfold chrominance-subcarrier frequency, three crystal oscillators (one each for PAL, NTSC, and SECAM) and one oscillator with three switchable crystals would be required. Therefore, the application of this principle is not limited to video recorders, but the principle can be used with success wherever color-television signals of several standards are to be processed in digitized form.

What is claimed is:

1. A video recorder having playback and recording modes, said video recorder operable in accordance with a selected one of the NTSC, PAL and SECAM television standards, said video recorder comprising:

a read/write head that stores analog signals on a recording medium during said recording mode, and and that reads a playback analog signal from said recording medium during said playback mode, said playback analog signal from said read/write head being a combination of a chroma signal, synchronization signals, and a luminance signal;

an analog input terminal to receive an external analog composite video input signal that includes a chroma signal, synchronization signals, and a luminance signal;

a first switch having a first input, a second input and an output, said first input electrically connected to said read/write head and said second input electrically connected to said analog input terminal, said first switch having a first operable condition for said recording mode to electrically connect said first input to said output and having a second operable condition for said playback mode to electrically connect said second input to said output, said output of said switch providing a first switched analog output, said first switched analog output corresponding to said playback analog signals for said recording mode and corresponding to said external analog composite video signal for said recording mode;

an analog-to-digital converter clocked by a first sampling signal having a single, fixed frequency that is the same irrespective of the selected one of said television standards to provide a single, fixed sampling rate, said analog-to-digital convertor having an analog input terminal electrically connected to said output of said first switch and having a digital output terminal, said digital output terminal of said analog-to-digital converter providing a digital output signal that is a digital representation of said first switched analog output signal from said first switch;

a first digital circuit, electrically connected to the digital output terminal of said analog-to-digital converter, that separates said digital output signal into a digital synchronizing signal and a digital luminance signal, said first digital circuit further including a first digital-to-analog convertor that converts said digital luminance signal to an analog luminance signal;

a second digital circuit that separates said digital output signal into a digital chroma signal, said digital chroma signal having a chrominance-subcarrier frequency corresponding to said one of said television standards, said second digital circuit comprising:

a first digital quadrature mixer that shifts said digital chroma signal to a shifted digital chroma signal having a second fixed frequency that is a fixed subharmonic of said fixed frequency of said first sampling signal;

a first digital band-pass filter electrically connected to said digital quadrature mixer to receive said shifted digital chroma signal and that provides a first digital band-pass filter output signal;

a decimator electrically connected to receive said first digital band-pass filter output signal, said decimator operating at a fixed decimator sampling frequency that is a fixed subharmonic of said fixed frequency of said first sampling signal, said decimator providing a decimator digital output signal at a rate corresponding to said decimator sampling frequency;

a digital color control circuit operating at said decimator sampling frequency that receives said decimator digital output signal and that provides an amplitude-controlled output signal;

a signal-forming band-pass filter operating at said decimator sampling frequency that receives said amplitude-controlled output signal from said color control circuit and that provides a band-limited output signal;

a comb filter operating at said decimator sampling frequency that receives said band-limited output signal and that provides a comb filter output signal;

means for selectively disabling said comb filter for said recording mode so that said comb filter output signal for said recording mode corresponds to said band-limited output signal from said signal-forming band-pass filter;

a first interpolator, electrically connected to receive said comb filter output signal, said first interpolator operating at the fixed frequency of said first sampling signal, said first interpolator providing a first interpolator output signal;

a second digital band-pass filter that receives said first interpolator output signal and provides a band-limited digital output signal;

a second digital quadrature mixer that receives said band-limited digital output signal from said second digital band-pass filter and that provides a processed digital output signal; and a second digital-to-analog converter, electrically connected to said second digital quadrature mixer, that converts said processed digital output signal into a processed analog chroma output signal;

an analog adder having a first input, a second input and an output, said first input electrically connected to the output of said first digital-to-analog convertor, said second input electrically connected to the output of said second digital-to-analog convertor; and a second switch having an input, a first output and a second output, said input electrically connected to said output of said analog adder, said first output electrically connected to said read/write head, and said second output electrically connected to an analog output terminal, second switch having a first operating position for said recording mode to electrically connect said output of said adder to said read/write head, said second switch having a second operating position for said playback mode to electrically connect said output of said adder to said analog output terminal.

2. The video recorder as defined in claim 1, wherein said first digital band-pass filter has the following transfer function with z equal to the fixed frequency of said first sampling signal:

$$H(z) = \frac{(1 + z^{-10})(1 - z^{-8})(1 + z^{-6})}{(1 + z^{-2})^3}.$$

3. The video recorder as defined in claim 1, wherein said signal-forming band-pass filter has the following transfer function with z equal to the fixed frequency of said first sampling signal:

$$H(z) = (1 - z^{-2})^5 (0.375 + z^{-2})(1 + 0.375 z^{-2}).$$

4. The video recorder as defined in claim 1, wherein said first interpolator has the following transfer function with z equal to the fixed frequency of said first sampling signal:

$$H(z) = \frac{(1 + z^{-2})(1 - z^{-4})(1 + z^{-6})^2}{(1 + z^{-2})^2}.$$

5. The video recorder as defined in claim 1, wherein said first quadrature mixer comprises:
a first digital signal generator that generates a first digital sine wave and a first digital cosine wave, said first digital signal generator providing said first digital sine wave as a first output and providing said first digital cosine wave as a second output;
a first multiplier having a first input, a second input and an output, said first input connected to the output of said analog-to-digital converter and said second input connected to said second output of said digital signal generator to receive said first digital cosine wave, said first multiplier providing a first multiplier output signal;
a second multiplier having a first input, a second input and an output, said first input connected to the output of said analog-to-digital converter and said second input connected to said first output of said digital signal generator to receive said first digital sine wave, said second multiplier providing a second multiplier output signal;
a first phase shift circuit having an input and an output, said first phase shift circuit input connected to the output of said second multiplier to receive said second multiplier output signal, said first phase shift circuit providing a first phase shifted output signal on said first phase shift circuit output that is shifted by 90 degrees with respect to said second multiplier output signal, said first phase shifted output signal delayed in time with respect to said second multiplier output signal by a predetermined amount of time;
a first delay circuit having a first delay circuit input and a first delay circuit output, said first delay circuit input connected to the output of said first multiplier to receive said first multiplier output signal, said first delay circuit providing a first delay circuit output signal that is delayed in time with respect to said first multiplier output signal by said predetermined amount of time.

6. The video recorder as defined in claim 5, wherein said second quadrature mixer comprises:
a second digital signal generator that generates a second digital sine wave and a second digital cosine wave, said second digital signal generator providing said second digital sine wave as a first output and providing said second digital cosine wave as a second output;
a third multiplier having a first input, a second input and an output, said first input connected to the output of said analog-to-digital converter and said second input connected to said second output of said second digital signal generator to receive said second digital cosine wave, said third multiplier providing a third multiplier output signal;
a fourth multiplier having a first input, a second input and an output, said first input connected to the output of said analog-to-digital converter and said second input connected to said first output of said second digital signal generator to receive said second digital sine wave, said second multiplier providing a second multiplier output signal;
a second phase shift circuit having an input and an output, said second phase shift circuit input connected to the output of said fourth multiplier to receive said fourth multiplier output signal, said second phase shift circuit providing a second phase shifted output signal on said second phase shift circuit output that is shifted by 90 degrees with respect to said fourth multiplier output signal, said second phase shifted output signal delayed in time with respect to said fourth multiplier output signal by a predetermined amount of time;
a second delay circuit having a second delay circuit input and a second delay circuit output, said second delay circuit input connected to the output of said third multiplier to receive said third multiplier output signal, said second delay circuit providing a second delay circuit output signal that is delayed in time with respect to said third multiplier output signal by said predetermined amount of time.

7. The video recorder as defined in claim 6, wherein said first digital signal generator has a frequency setting input and a phase control input, said first digital signal generator further including:
an oscillator that generates a horizontal deflection signal; and
a phase lock loop circuit that compares said digital synchronizing signal from said first digital circuit with said horizontal deflection signal from said oscillator and that generates a phase lock loop output signal that is provided as an input into said phase control input of said first digital signal generator;
and wherein:
in said recording mode, a first digital signal equal to the difference between one-quarter of the fixed frequency of said first sampling signal and the chrominance-subcarrier frequency is applied to the frequency-setting input of said first digital signal generator; and
in said playback mode, a second digital signal is applied to the frequency-setting input of said first digital signal generator, said second digital signal equal to a selected one of:

the sum of one-quarter of the fixed frequency of said first sampling signal and 40 times the known horizontal frequency of the NTSC standard when said video recorder is operating in accordance with said NTSC television standard; and the sum of one-quarter of the fixed frequency of said first sampling signal and 40.125 times the associated known horizontal frequency one of said PAL and SECAM standards when said video recorder is operating in accordance with one of said PAL and SECAM standards.

8. The video recorder as defined in claim 7, wherein said second digital signal generator has a frequency-setting input and wherein said second digital signal is applied to said frequency-setting input of said second digital signal generator in said recording mode and said first digital signal is applied to said frequency-setting input of said second digital signal generator in said playback mode.

9. The video recorder as claimed in claim 1, wherein said first digital circuit comprises:

a first subchannel that is operable only in said recording mode, said first subchannel comprising:

a first digital low-pass filter having an input and an output, said input connected to the output of said analog-to-digital converter, said first digital low-pass filter providing an output signal on said output, said output signal having an upper cutoff frequency of about 3 MHz;

a digital sync separator stage having an input and an output, said input connected to said output of said first digital low-pass filter to receive said output signal of said first digital low-pass filter, said output of said digital sync separator providing said digital synchronizing signal;

a digital deemphasis and limiter stage having an input and an output, said input connected to said output of said first digital low-pass filter to receive said output signal of said first digital low-pass filter;

a digital voltage-controlled oscillator having a first input, a second input and an output, said first input connected to said output of said digital deemphasis and limiter stage, said second input receiving a digital input having a value that is selected in accordance with said selected one of said television standards, said digital voltage-controlled oscillator providing an output signal having a frequency that is determined by said value of said digital input; and a first digital high-pass filter having an input and an output, said input of said first digital high-pass filter connected to said output of said digital voltage-controlled oscillator to receive said output signal from said digital voltage-controlled oscillator, said first digital high-pass filter providing a first digital high-pass filter output signal that has a lower cutoff frequency of approximately 1.5 MHz, said output of said first digital high-pass filter provided as the input of said second digital-to-analog converter in said recording mode;

and a second subchannel that is operable only in said playback mode, said second subchannel comprising:

a second digital high-pass filter having an input and an output, said input connected to the output of said digital-to-analog converter, said second digital high-pass filter providing a second digital high-pass filter output signal having a lower cutoff frequency of about 1.5 MHz; and a digital frequency detector having an input and an output, said input of said digital frequency detector connected to the output of said second digital high-pass filter to receive said second digital high-pass filter output signal, said output of said digital frequency detector electrically coupled to said input of said second digital-to-analog converter in said playback mode.

10. The video recorder as defined in claim 9, wherein said second subchannel further comprises:

a decimating digital low-pass filter having an input and an output, said input connected to said output of said frequency detector, said output of said decimating digital low-pass filter providing a decimating low-pass filter output signal having an upper cutoff frequency of about 3 MHz and clocked with a clock signal having a frequency of one-half the fixed frequency of said first sampling signal;

a digital deemphasis and noise-reduction stage having an input and an output, said input of said digital deemphasis and noise-reduction stage connected to said output of said decimating digital low-pass filter;

a dropout detector having an input and an output, said input of said dropout detector connected to said output of said second digital high-pass filter to receive said second digital high-pass filter output signal, said output of said dropout detector providing a dropout detector output signal that has a first value when said second digital high-pass signal has a magnitude above a predetermined level and that has a second value when said second digital high-pass signal has a magnitude below said predetermined level;

an electronic changeover switch having a first input, a second input and an output, and further having a control input, said first input connected to said output of said digital deemphasis and noise-reduction stage, said control input connected to said output of said dropout detector, said control input operating said electronic changeover switch to a first condition when said dropout detector output signal has said first value so that said first input of said electronic changeover switch is connected to said output of said electronic changeover switch and operating said electronic changeover switch to a second condition when said dropout detector output signal has said second value so that said second input of said electronic changeover switch is connected to said output of said electronic changeover switch;

a delay stage having an input and an output, said input of said delay stage connected to said output of said electronic changeover switch, said output of said delay stage providing a delay stage output signal that is delayed from a signal on said input of said delay stage by an amount of time equal to the amount of time between successive scanning lines of said composite video signals, said output of said delay stage connected to said second input of said electronic changeover switch so that said output of said delay stage is connected to said output of said electronic changeover switch when said electronic changeover switch is operated to said second condition;

a digital adder having a first input, a second input and an output, said first input connected to said output of said electronic changeover switch;

a digital correlator having a first input, a second input and an output, said first input of said digital correlator connected to said output of said delay stage, said second input of said digital correlator connected to said output of said digital adder, said output of said digital correlator connected to said second input of said digital adder; and a second interpolator having a signal input, a signal output and a clock input, said signal input connected to said output of said digital adder, said clock input clocked by said first sampling signal, said signal output of said second interpolator connected to said input of said second digital-to-analog convertor in said playback mode.

11. A video recorder as claimed in claim 10, wherein said digital frequency detector comprises:

a 90-degree phase shifter having an input and an output, said input corresponding to said input of said digital frequency detector and connected to said output of said second digital high-pass filter, said 90-degree phase shifter providing a phase-shifted output signal on said output of said 90-degree phase shifter that is shifted in phase by 90 degrees from said input and that is delayed in time by a predetermined amount of time with respect to said input, said phase-shifted output signal comprising a plurality of bits, the most significant of said plurality of bits being the sign bit of said phase-shifted output signal;

a delay element having an input and an output, said input of said delay element corresponding to said input of said digital frequency detector and connected to said output of said second digital high-pass filter, said delay element providing a delay element output signal on said output of said delay element that is delayed in time by an amount of time equal to said predetermined amount of time of said 90-degree phase shifter, said delay element output signal comprising a plurality of bits, the most significant of said plurality of bits being the sign bit of said delay element output signal;

a first digital absolute value stage having an input and an output, said input of said first digital absolute value stage connected to said output of said delay element, said output of said first digital absolute value stage providing a first digital absolute value signal;

a second digital absolute value stage having an input and an output, said input of said first digital absolute value stage connected to said output of said 90-degree phase shifter, said output of said second digital absolute value stage providing a second digital absolute value signal;

a digital subtracter having a subtrahend input, a minuend input and an output, said subtrahend input connected to said output of said first absolute value stage, said minuend input connected to said output of said second absolute value stage, said subtracter output comprising multiple bits, one of said bits being a sign bit output, said sign bit output having a first binary stage when the digital value applied to said subtrahend input is greater than the digital value applied to said minuend input and having a second binary state when the digital value applied to said subtrahend input is not greater than the digital value applied to said minuend input;

an electronic multiple intermediate switch having a first signal input, a second signal input, a first signal output, a second signal output and a control input, said first signal input connected to said output of said first digital absolute value stage, said second signal input connected to said output of said second digital absolute value stage, and said control input connected to said sign bit output of said subtracter, said control input operating said electronic multiple intermediate switch to a first condition when said sign bit output has said first binary level and operating said electronic multiple intermediate switch to a second condition when said sign bit output has said second binary level;

a digital divider having a dividend input, a divisor input and an output, said dividend input connected to said first output of said electronic multiple intermediate switch, said divisor input connected to said second output of said electronic multiple intermediate switch, said sign bit of said subtracter controlling said electronic multiple intermediate switch so that when one of said first digital absolute value signal and said second digital absolute value signal is greater than the other of said first digital absolute value signal and said second digital absolute value signal, the larger of said signals is applied to said divisor input of said digital divider and the magnitude of the divider output signal is thereby limited to the range of zero to one;

a ready-only memory having an address input and a data output, said address input of said read-only memory connected to said output of said digital divider, said read-only memory storing digital values corresponding to the arc-tangent values of the first half quadrant of a circle and providing a selected one of said digital values as said data output in accordance with said address, said data output comprising a plurality of data bits;

a first exclusive-OR element having a first input, a second input an ouput, said first input connected to receive said sign bit of said delay element output signal, said second input connected to receive said sign bit of said phase-shifted output signal, said output of said first exclusive-OR element being a binary signal having a binary signal level that is the exclusive-OR of said sign bit of said delay element output signal and said sign bit of said phase-shifted output signal;

a second exlusive-OR element having a first input, a second input and an output, said first input connected to said output of said first exclusive-OR element, said second input connected to said sign bit output of said subtracter, said output of said second exclusive-OR element being a binary signal having a binary signal level that is the exclusive-OR of said output of said first exclusive-OR element and said sign bit output of said subtracter;

a multiple inverter having a plurality of inverters, each of said inverters having an input and an output, each such input connected to receive a data bit output of said read-only memory, each said inverter providing an inverter output that is the binary inverse of the corresponding inverter input;

a first multiple switch having a plurality of switching elements corresponding to said plurality of data bits of said data output of said read-only memory, each of said switching elements having a first input, a second input and an output, said first input of each switching element connected to the corresponding data bit output of said read-only memory, said second input of each switching element connected to the output of the corresponding inverter output, the output of each switching element being connected to a corresponding output of said read-only memory when said first multiple switch is in a first condition and being connected to a corresponding output of one of said inverters when said first multiple switch is in a second condition, said first multiple switch including a common control input, said common control input connected to said output of said second exclusive-OR element, said common control input responsive to a first binary level on said output of said exclusive-OR element to cause said first multiple switch to be in said first condition and responsive to a second binary level on said output of said exclusive-OR element to cause said first multiple switch to be in said second condition; and a digital differentiator having a digital input and a digital output, said digital input having a most significant bit input, a second most significant bit input, a third most significant bit input and a plurality of least significant bit inputs, each of said plurality of least significant bit inputs connected to a corresponding one of said outputs of said switching elements of said first multiple switch, said most significant bit input connected to said sign bit output of said delay element, said second most significant bit connected to said output of said first exclusive-OR element and said third most significant bit connected to said output of said second exclusive-OR element, said digital output of said digital differentiator corresponding to said output of said digital frequency detector.

12. The video recorder as defined in claim 1, wherein said first sampling signal has a fixed frequency in the range of 18 to 20 MHz.

13. The video recorder as defined in claim 12, wherein said first sampling signal has a fixed frequency of 18 MHz.

14. The video recorder as defined in claim 1, wherein said second digital circuit further comprises:

a third digital circuit, said third digital circuit comprising:

a first switchable digital filter having an input and an output, said input connected to said first digital band-pass filter of said second digital circuit, said first switchable digital filter having a switchable filter characteristic, said characteristic being bell-shaped in said recording mode, said characteristic being inverse bell-shaped in said playback mode;

a digital frequency detector having an input and an output, said input of said digital frequency detector connected to said output of said switchable digital filter;

a frequency modulator having a signal input, a signal output and a control input, said frequency modulator providing first and second frequency deviations, said first frequency deviation active in said recording mode and said second frequency deviation active in said playback mode; and a second switchable digital filter having an input and an output, said input of said second switchable filter connected to said frequency modulator, said second switchable digital filter having a switchable filter characteristic, said characteristic being bell-shaped in said playback mode, said characteristic being inverse bell-shaped in said recording mode;

and a selector switch interposed between said first interpolator and said second digital band-pass filter of said second digital circuit, said selector switch having a first input, a second input and an output, said first input connected to said output of said first interpolator, said second input connected to said output of said second switchable digital filter, said output connected to said input of said second digital band-pass filter of said second digital circuit, said selector switch operable to a first condition to connect said first input of said selector switch to said output of said selector switch so that said output of said first interpolator is connected to said second digital band-pass filter for said PAL television standard and said NTSC television standard, said selector switch operable to a second condition to connect said second input of said selector switch to said output of said selector switch so that said output of said second switchable digital filter is connected to said input of said second digital band-pass filter for said SECAM television standard.

15. In a video recorder that includes an analog read-/write head which stores analog signals on a recording medium and which reads analog signals from said recording medium, an input terminal that receives an analog composite video input signal, an output terminal that provides a composite video analog output signal, and an electronic circuit operable in a selected one of a record mode and a playback mode and operable in accordance with a selected one of the NTSC, PAL and SECAM television standards, said electronic circuit processing said analog composite video input signal in said record mode and providing an analog representation of said composite video signal to said read/write head to be stored on said recording medium, said electronic circuit processing said analog signals from said read/write head in said playback mode and providing said composite video analog output signal on said output terminal, the improvement wherein said electronic circuit comprises:

an analog-to-digital convertor that has an input and an output, said analog-to-digital convertor receiving an analog input signal via said input and providing a digital representation of said analog input signal on said output, said analog-to-digital convertor clocked by a first sampling signal having a first fixed frequency that is the same irrespective of the selected one of the television standards, said analog-to-digital convertor providing said digital representation on said output at a rate corresponding to said first fixed frequency of said first sampling signal;

an input selector switch having a first switch input, a second switch input and a switch output, said first switch input electrically connected to said input terminal, said second switch input electrically connected to said read/write head, and said switch output electrically connected to said input of said analog-to-digital convertor, said input selector switch operable in said record mode to connect said first switch input to said switch output to provide said analog composite video input signal as the analog input signal to said analog-to-digital convertor, said input selector switch operable in said playback mode to connect said second switch input to said switch output to provide said analog signal from said read/write head as the analog input signal to said analog-to-digital convertor, said analog input signal provided to said analog-to-digital convertor including a chrominance component, said digital representation provided by said analog-to-digital convertor comprising a digitized video signal that includes a digital representation of said chrominance component;

a first digital mixing circuit that has an input and an output, said input of said digital mixing circuit connected to said digitized video signal output of said analog-to-digital convertor, said digital mixing circuit receiving the digitized video signal output of said analog-to-digital convertor at said first fixed frequency and providing a first digital mixing circuit output signal on said mixing circuit output at a second fixed frequency that is a fixed subharmonic of said first fixed frequency, said first digital mixing circuit output signal comprising the chrominance component of said digitized video signal, said first digital mixing circuit comprising a signal generator that generates a first mixing signal that is selected in accordance with the known horizontal frequency of the selected one of the television standards so that said second fixed frequency is the same irrespective of the selected one of the television standards;

a chrominance processing circuit having an input and an output, said input coupled to receive said first digital mixing circuit output signal from said first digital mixing circuit, said chrominance processing circuit processing said first digital mixing circuit output signal and providing a processed chrominance output signal, said chrominance processing circuit operating at a third fixed frequency that is a fixed subharmonic of said first fixed frequency and that is constant irrespective of the selected one of the television standards;

a second digital mixing circuit having an input and an output, said input of said second digital mixing circuit coupled to the output of said chrominance processing circuit to receive said processed chrominance output signal, said second digital mixing circuit mixing said processed chrominance output signal with a selected second mixing signal to provide a second digital mixing circuit output signal;

a first digital-to-analog convertor having an input and an output, said input connected to the output of said second digital mixing circuit to receive said second digital mixing circuit output signal, said digital-to-analog convertor providing an analog output signal corresponding to said second digital mixing circuit output signal;

a digital composite video circuit having an input and an output, said input connected to said output of said analog-to-digital convertor to receive said digitized video signal, said digital composite video circuit generating a synchronization signal and further generating a digitized luminance signal, said luminance signal provided as an output on said output of said digital composite video circuit;

a second digital-to-analog convertor having an input and an output, said input connected to said output of said digital composite video circuit to receive said digitized luminance signal, said second digital-to-analog convertor providing an analog representation of said digitized luminance signal on said output of said digital-to-analog convertor;

an analog adder that has a first input, a second input, and an output, said first input connected to said output of said first digital-to-analog convertor, said second input connected to said output of said second digital-to-analog convertor, said output providing an analog composite video output signal having a chrominance component and a luminance component; and a second switch having an input, a first output and a second output, said input connected to said output of said analog adder to receive said analog composite video output signal, said first output connected to said read/write head, said second output connected to said output terminal, said second switch operable to a first condition in said record mode to connect said input to said first output to provide said analog composite video output signal to said read/write head in said record mode and operable to a second condition in said playback mode to connect said input to said output to provide said analog composite video output signal to said output terminal in said playback mode.

16. In a video recorder that is operable at a selected one of the NTSC, PAL and SECAM television standards, said video recorder having an analog composite video input signal, comprising chrominance, luminance and synchronizing components, said analog composite video input signal switchable between an external video signal source and a video read/write head and having an analog composite video output signal, comprising chrominance, luminance and synchronizing components, said analog composite video output signal switchable between said video read/write head and an external device, an improved electronic circuit that processes said analog composite video input signal and provides said analog composite video output signal, said improved electronic circuit comprising:

an analog-to-digital convertor having an input and an output, said input receiving said analog composite video input signal, said analog-to-digital convertor sampling said analog composite video input signal at a first fixed sampling rate and providing a digitized composite video output signal at said first fixed sampling rate, said digitized composite video output signal comprising digitized chrominance, luminance and synchronizing components, said first fixed sampling rate constant irrespective of said selected one of said television standards;

a digital mixer circuit having a first input, a second input and an output, said first input receiving said digitized composite video output signal at said first fixed sampling rate that is the same irrespective of said selected one of said television standards, said second input receiving a mixing signal, said mixing signal having a frequency selected in accordance with said selected one of said television standards, said digital mixer circuit providing an output signal comprising said digitized chrominance component at a second fixed sampling rate that is a predetermined subharmonic of said first fixed sampling rate;

means coupled to said digital mixer circuit for processing said digitized chrominance component, said means comprising:
- a decimator that samples said digitized chrominance component at a third fixed sampling rate that is a predetermined subharmonic of said first fixed sampling rate and that is the same irrespective of said selected one of said television standards, said decimator providing a decimator output signal;
- a color control circuit coupled to said decimator that operates at said third fixed sampling rate to control the amplitude of said digitized chrominance component and that provides an amplitude-controlled chrominance component; and
- a digital interpolator having an input and an output, said input coupled to said color control circuit, said interpolator operating at said first fixed sampling rate to provide an interpolated output signal corresponding to said processed digitized chrominance component on said output at said first fixed sampling rate; and
- a digital-to-analog convertor having an input and an output, said input coupled to said output of said interpolator to receive said processed digitized chrominance component, said digital-to-analog convertor converting said digitized processed chrominance component to an analog processed chrominance component, said analog processed chrominance component comprising said chrominance component of said analog video composite output signal.

* * * * *